United States Patent [19]

Takasaki

[11] Patent Number: 5,504,813
[45] Date of Patent: Apr. 2, 1996

[54] PORTABLE TELEPHONE

[75] Inventor: Yukio Takasaki, Kanagawa, Japan

[73] Assignee: Sony Corporation, Tokyo, Japan

[21] Appl. No.: 500,743

[22] Filed: Jul. 11, 1995

Related U.S. Application Data

[63] Continuation of Ser. No. 189,712, Feb. 1, 1994, abandoned.

[30] Foreign Application Priority Data

Feb. 12, 1993 [JP] Japan ................................. 5-046028

[51] Int. Cl.$^6$ ................................................ H04M 1/00
[52] U.S. Cl. ................................ 379/433; 379/434
[58] Field of Search ................................ 379/433, 434, 379/428, 58, 61; D14/138

[56] References Cited

U.S. PATENT DOCUMENTS

D. 350,744  9/1994  Hino ........................................ D14/138

| | | | |
|---|---|---|---|
| 5,197,091 | 3/1993 | Takagi et al. | 379/58 |
| 5,259,019 | 10/1993 | Stilley | 379/433 |
| 5,327,584 | 7/1994 | Adachi et al. | 379/433 |
| 5,369,857 | 12/1994 | Sacherman et al. | 379/430 |

FOREIGN PATENT DOCUMENTS

| 274046 | 11/1990 | Japan | 379/61 |
|---|---|---|---|
| 198436 | 8/1991 | Japan | 379/61 |

*Primary Examiner*—Jeffery Hofsass
*Assistant Examiner*—Jack Chiang
*Attorney, Agent, or Firm*—Jay H. Maioli

[57] ABSTRACT

A small-sized, lightweight portable telephone has a microphone mounted on a rotatable arm that can be released into a use position using only one hand, which is also grasping the telephone. Even if an excessive load is applied to the microphone arm, which is rotatably supported relative to the telephone main member, damage is prevented by a spring-loaded detent mechanism. The microphone arm has built in it a core member formed of a shape-memory alloy and constituted by a flexible casing, so that deformation can occur without permanent damage to the arm.

9 Claims, 6 Drawing Sheets

PORTABLE TELEPHONE

This is a continuation of application Ser. No. 08/189,712 filed Feb. 1, 1994, now abandoned.

BACKGROUND OF THE INVENTION

1. Field of the Invention

This invention relates generally to a portable telephone and, more particularly, to a portable telephone having a telephone main body, a receiver, a dial switch, a radio call circuit, and a power battery.

2. Description of the Related Art

The number of subscribers to the portable telephone system is drastically increasing due to improved performance of the component parts, better calling capabilities due to improved and more accurate radio relay stations, lower fees, as well as changes in business configuration and social environment. Therefore, demand is raised for a portable telephone that is reduced in size and weight, that is of a so-called pocket size, and which nevertheless has a transmitter, a receiver, a dial switch, a radio call circuit, a power battery and so forth.

The sheet switch configuration of the dial switch, the development of a high-performance battery, and the improved integration degree of electronic parts have led to significant reductions in weight. Nevertheless, because it is necessary for the transmitter and the receiver of the telephone to be arranged at a relative distance equal to the interval between the ear and the mouth and because of other functional constraints, the overall size of the telephone is determined by the distance between the transmitter and the receiver, that is, between the speaker the microphone.

Generally, in a telephone it is preferred to set the linear distance between the speaker and the microphone and the angle therebetween to 13.5 to 14.3 cm and about 23.3° to 13.4°, respectively. Because of these design constraints a telephone has been proposed that is partitioned into a transmitter side section or block with the microphone and a receiver side section or block with the speaker, and these two blocks are adapted to be collapsible for reducing the overall size. One example of such a collapsible telephone is found in U.S. Pat. No. 4,845,772.

It is possible with this type of collapsible or foldable telephone to reduce its size to approximately one-half of the common telephone. Nevertheless, it is necessary to partition the control substrate, that is, the circuit board bearing the operating and control electronics, into two separate portions as well. Besides, owing to the collapsible construction, the telephone is increased in thickness and moreover is difficult to use and handle.

Meanwhile, there is disclosed in Japanese Laid Open Patent No SHO/61-198851 entitled "Speaker Microphone", a hand microphone of the type employed in a car phone having an extension microphone similar to a telephone handset, which extension microphone typically resides in a hand microphone casing and which may be pulled out of the hand microphone casing or rotated for use.

In such hand microphone in which, for example, the extension microphone is pulled out of the casing for use, it is difficult to set the relative positions of the speaker and the microphone, so that the speaker and the microphone may not be in correct correspondence with the ear and the mouth, which are disposed in a predetermined three-dimensional disposition relative to each other, such that call properties are worsened when the hand microphone is applied to the portable telephone. This problem is derived from the arrangement that the microphone is not rotatable relative to the main body.

On the other hand, if the extension microphone is adapted to be rotated relative to the casing, the relative disposition of the speaker and the microphone may be adapted so that the speaker and the microphone may be in correspondence with the ear and the mouth. Consequently, by adapting the technology to the portable telephone so that the transmitter member having built therein the transmitter is rotatably assembled to the lateral surface of the main body, it becomes possible to develop a small-sized portable telephone that is substantially the same width as and a length approximately one-half of the conventional telephone. Such a portable telephone is represented in U.S. Pat. No. 5,197,091.

Nevertheless, with the portable telephone with the rotatable extension microphone, since the extension microphone is adapted to be extended to a pre-set configuration by being rotated in a lateral direction away from a housing recess formed on one lateral surface of the telephone case, the finger ends of the hand gripping the telephone are also retaining the extension microphone, as a result of which difficulties are raised in manipulating the telephone using only one hand, as might be required with a car phone.

Moreover, because the extension microphone is of a relatively simple construction, if the hand or other object is impacted on the extension microphone, so as to apply an excessive load thereon, there is the risk of breakage of the extension microphone itself or of the rotation supporting means. Thereby raising problems in implementation of the portable telephone making use of the hand microphone technology.

OBJECTS AND SUMMARY OF THE INVENTION

It is therefore an object of the present invention to provide a small-sized and lightweight portable telephone that may be operated with one hand.

It is another object of the present invention to provide a portable telephone in which there is no risk of breakage even under an excessive load applied to the microphone arm that is rotatably supported relative to the telephone main body.

In accordance with an aspect of the present invention, there is provided a portable telephone comprising a telephone main body having a receiver, a dial switch, a radio call circuit and a power battery, a speaker, combined with a microphone arm, microphone, and a slide release mechanism. The microphone arm is rotatably attached to a lateral side of the telephone main body for rotation freely by being supported at one side via a rotation supporting unit, with the microphone arm having the microphone assembled to a free end thereof. A resilient element for biasing the microphone arm into rotation is built into the rotation supporting unit, and there is mounted in the telephone main body a microphone arm holding member for holding the free end of the microphone arm. The microphone arm is released from the retained state by manipulating the slide release mechanism.

In addition in the portable telephone of the present invention, an overload breakage preventative mechanism is built into the rotation supporting structure for permitting rotation of the microphone arm when an overload in the rotating direction is applied to the microphone arm, which is regulated to a pre-set angular position by the rotating position regulating means relative to the telephone main body.

PREFERRED EMBODIMENT OF THE PRESENT INVENTION

Figure 1:
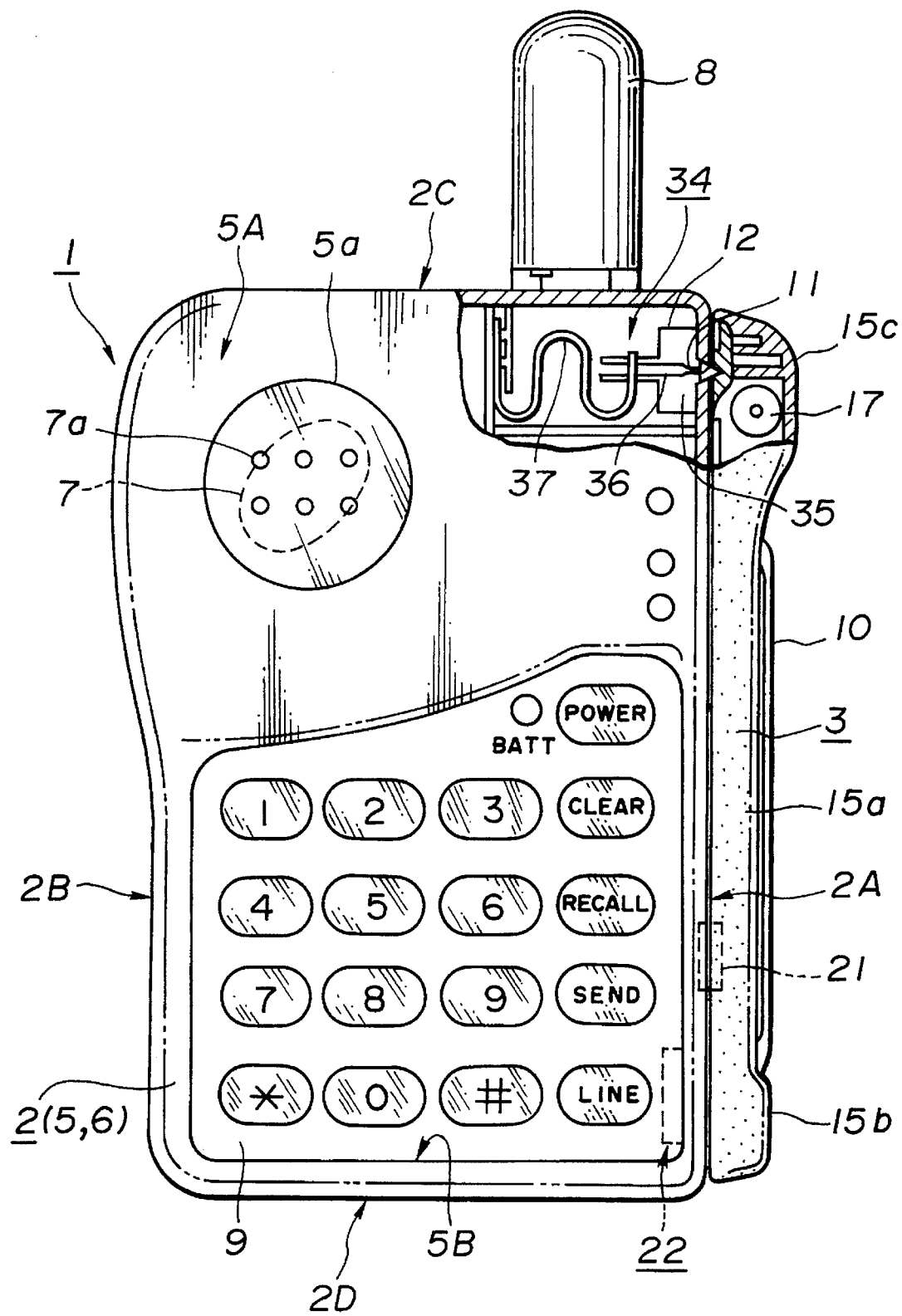
FIG. 1 is a front view, partially cut away, of a portable telephone according to an embodiment of the present invention.
Figure 2:
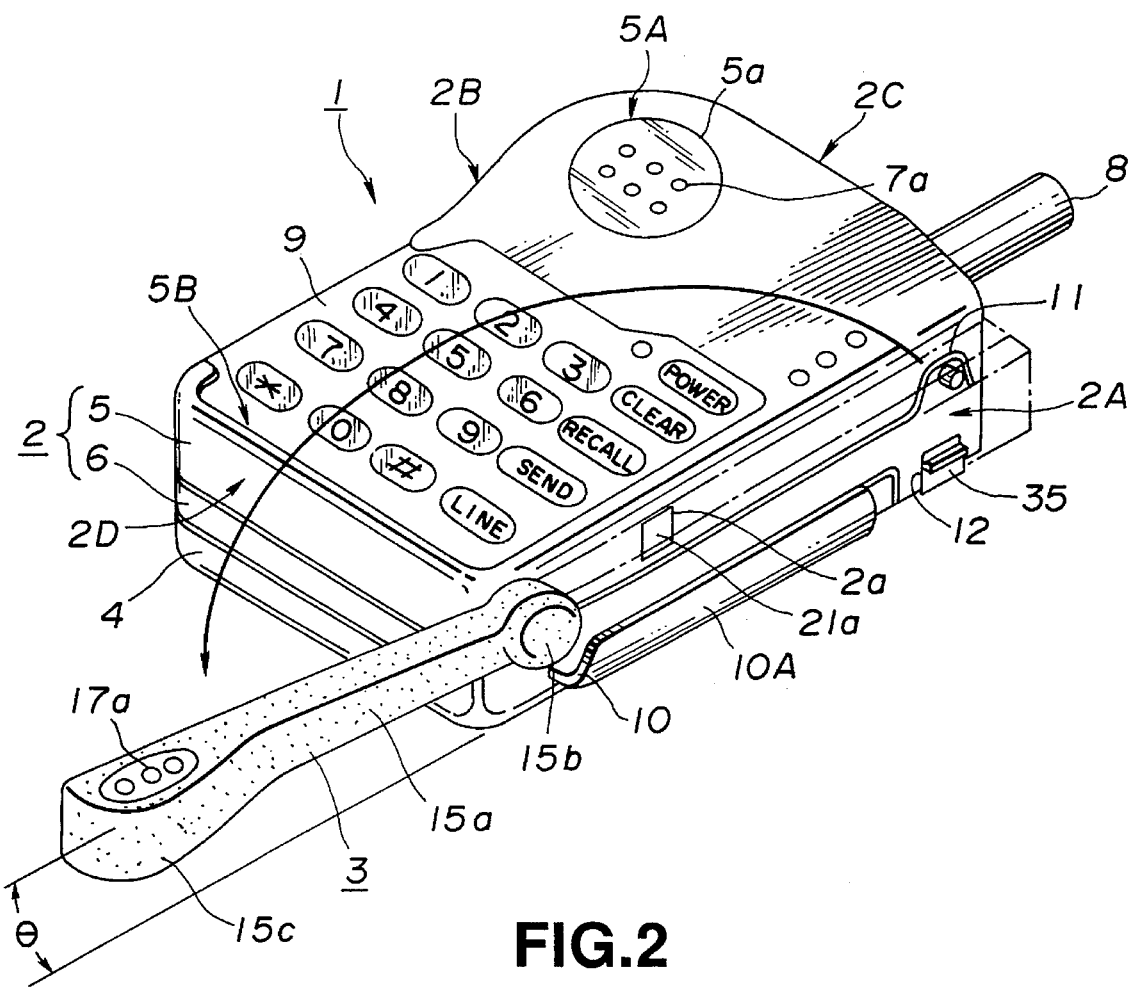
FIG. 2 is a perspective view of the portable telephone of FIG. 1 a state in which it is being used.

In the embodiment of FIGS. 1 and 2, the palm-size portable telephone of the present invention is comprised of a telephone main body 2, a microphone arm 3 and a power source box 4 formed of synthetic resin and having a power source battery loaded therein.

The telephone main body 2 is a substantially thin box formed of an upper case 5 and a lower case 6. Within the telephone main body 2, there is enclosed a control board (not shown) having mounted thereon a speaker 7, as well as call circuit components, dialling circuit components, radio circuit components, a power source circuit or the like.

A lateral surface 2A constituting a longitudinal side surface of the telephone main body 2 is substantially flat and acts as a mounting portion for the microphone arm 3, as later described. On the upper lateral surface 2C forming the widthwise side is arranged an extendable antenna 8, which is positioned towards the right side 2A.

The area of the lateral surface 2B opposite the lateral side 2A extending from the longitudinal mid position up to the top 2C is swollen arcuately or gently rounded outwardly, while an area 5A of the upper case 5 associated with the swollen portion of the left side 2B is also swollen in the direction of thickness or raised for forming a smooth hill-shaped surface.

By providing the microphone arm 3 on the right side 2A and the antenna 8 on the top side 2C of the telephone main body 2 and by forming the arcuate swollen portion on the left side 2B, the portable telephone 1 is constructed in a shape that is readily gripped with the left hand. The swollen portion is then disposed at the root of the thumb and with the finger tips toward the microphone arm 3.

Since the portable telephone 1 is gripped with the left hand, the lateral surface 2A is termed the right side, the opposite lateral surface 2B is termed the left side, the lateral surface 2C mounting the antenna 8 is termed the top side and the opposite lateral surface 2D is termed the bottom.

Beneath the swollen area 5A of the upper case 5 is a circuit board (not shown) that acts as a mounting portion for the speaker 7 enclosed in the telephone main body 2, and also at area 5A is a circular trough 5a and plural sound radiating holes 7a. By arranging the receiver main body to have a smooth hill-shaped surface, as described above, the portable telephone 1 fits smoothly to the ear of the user.

The lower area 5B opposite the swollen area 5A of the upper case 5 is formed as a modified pentagonal-shaped trough to which a switch sheet 9 is mounted for forming a switch unit. The switch sheet 9 joined to the main body 5 at the switch area 5B has a dial switch unit, a power switch unit, and other functional switch units. Sheet switches are thin flexible sheets in which switch contacts are provided on two spaced-apart sheets. When a switch is to be actuated, one of the sheets is deformed by pressing with a finger and the switch contact is made. A flexible cable (not shown) is led into the interior of the telephone main member 2 via a guide hole formed at a suitable position in the upper case 4, so that the switch sheet 9 is connected to the control circuit board.

A protective cover or cradle 10 for the microphone arm 3 is protruded integrally from the lower case 6 on the right lateral surface 2A of the telephone main body 2. That is, the protective cover 10 protrudes horizontally from the right lateral surface 2A to a width slightly larger than the width of the microphone arm 3 and is formed into an L-shaped cross-section having a side wall 10A upstanding towards the upper cover 5 parallel to the right lateral surface 2A.

The lateral wall 10A of the protective cover 10 has its upper edge below the upper case 5 and is of a length extending to a reduced-diameter portion 15a of the microphone arm 3, By the provision of the protective cover 10, there is no such inconvenience that, when the portable telephone 1 is gripped with the left hand, the finger ends obstruct the operation of rotating the microphone arm 3 into the operation position.

Figure 3:
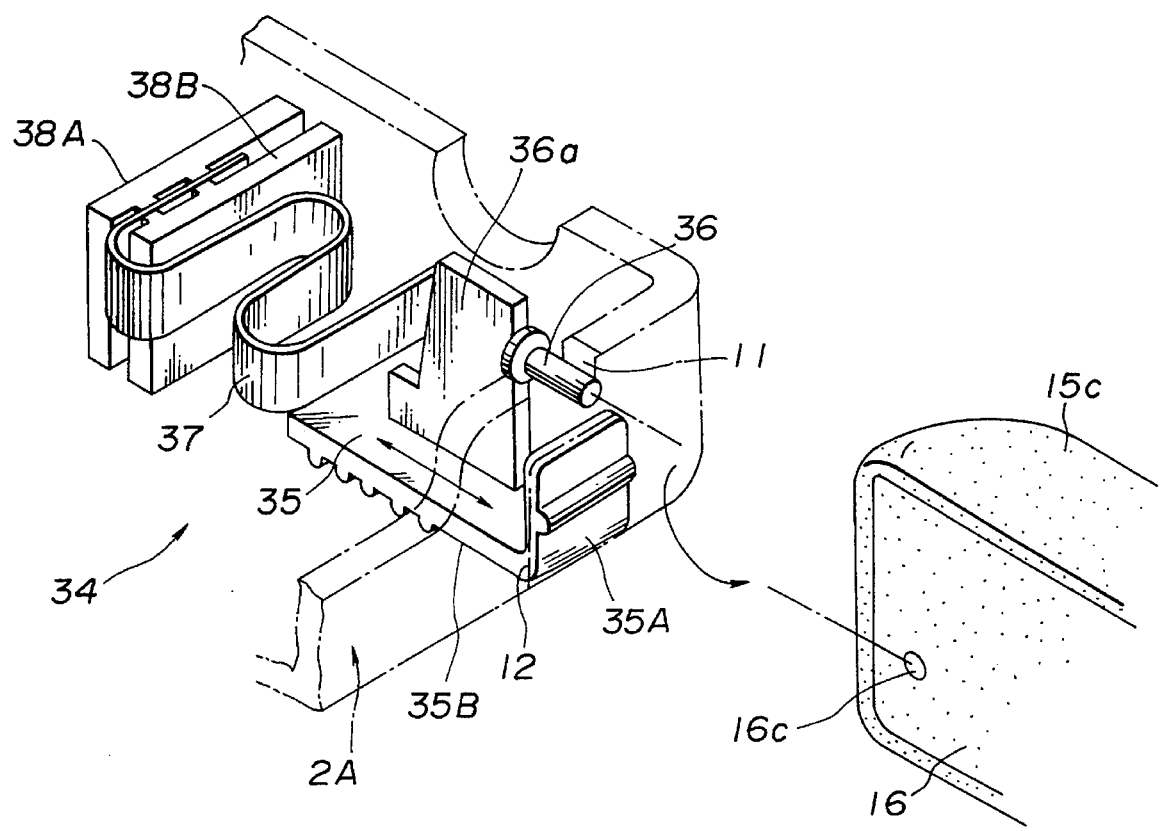
FIG. 3 is an exploded perspective view illustrating a microphone arm holding unit of the portable telephone of FIG. 1.

On the right lateral surface 2A of the telephone main body 2 is provided a holding pin guide hole 11 disposed toward the upper lateral surface 2C and along which a holding pin 36 of a microphone arm holding unit 34 is reciprocated. An operator guide groove 12 is formed in lower case half 6 extending as far as the bottom side and in which an operator element 35 of a microphone arm holding unit 34 is assembled as shown in FIG. 3.

Figure 4:
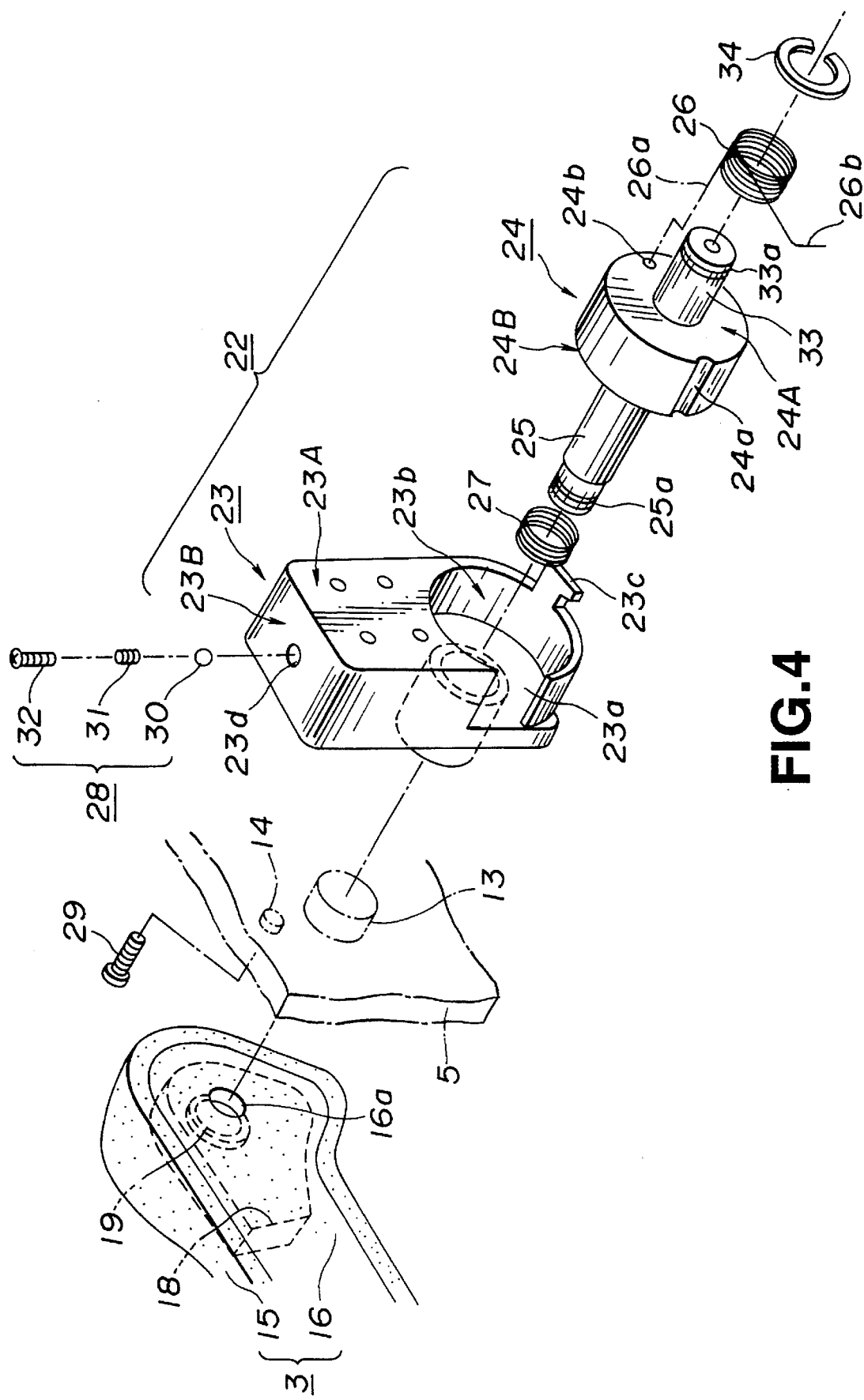
FIG. 4 is an exploded perspective view useful in explaining the microphone arm rotating and supporting unit of the portable telephone of FIG. 1.

An axial hole 13 and a tapped hole 14 are formed in the right lateral surface 2A toward the bottom 2D, as shown in FIG. 4. A tubular shaft 25 of the rotation supporting unit 22 for rotatably supporting the microphone arm 3 is passed through the axial hole 13 and the tapped hole 14 is employed for mounting the rotation supporting unit 22.

Figure 5:
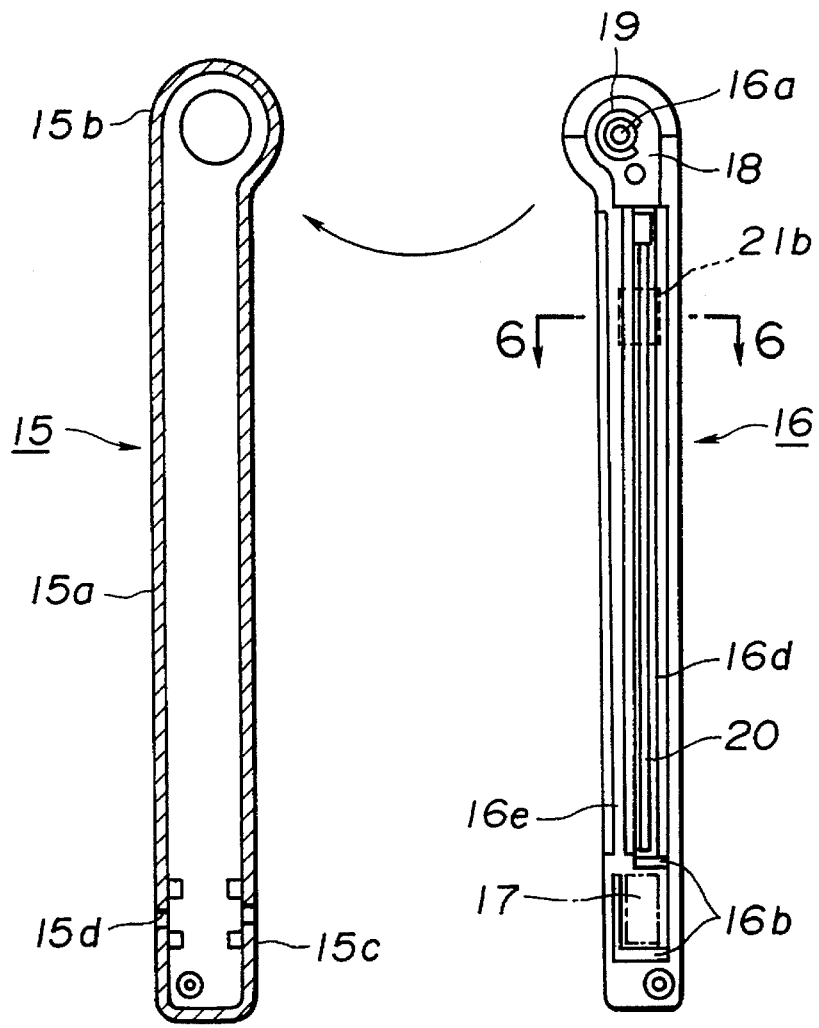
FIG. 5 is a developed view of the microphone arm of the portable telephone of FIG. 1.

The microphone arm 3, as shown in FIGS. 1 and 5, is made up of a trough-shaped upper member 15 of a semi-circular cross-section, molded of a material exhibiting elasticity, such as rubber, and a plate-shaped lower member 16 mounted for covering the open area of the upper member 15, so that the microphone arm 3 in its entirety is formed as a hermetically closed, elongated tubular member having a semi-circular cross-section and exhibiting elasticity along its length.

The microphone arm 3 has a length substantially equal to that of the telephone main body 2. The microphone arm 3 is rotated relative to the main telephone body 2 for maintaining the relative position between the speaker 7 mounted on the main telephone body 2 and a microphone 17 mounted on the microphone arm 3. In other words, both the telephone main body 2 and the microphone arm 3 have a length equal to about one-half the optimum distance between the speaker 7 and the microphone 17.

The upper member 15 is swollen at both ends thereof for increasing its height, as shown in FIG. 1, whereby the increased volumes formed on both ends are connected via a central small-diameter portion 15A and act as pivot unit housing unit 15B and as a microphone housing unit 15C, respectively.

The one lateral surface of the upper member 15 constituting the microphone housing unit 15C, specifically the side that is flush with the surface of the upper case 5 when the microphone arm 3 is rotated relative to the telephone main member 2, is formed with at least one sound transmitting hole 17a.

An axial hole 16a is bored in one end of the lower member 16 in register with the pivot unit housing unit 15B, as shown in FIG. 5, and a pair of microphone supporting pieces 16b are integrally set upright on the inner surface on the other end in register with the microphone receiving unit 15C, so that the pieces are separated from each other in the longitudinal direction. An engaging hole 16c in the lower member 16 is engaged by a holding pin 36 of a microphone arm holding unit 34, shown in FIG. 3, and is formed in the outer lateral surface on the opposite end from the microphone supporting pieces 16b.

Figure 6:
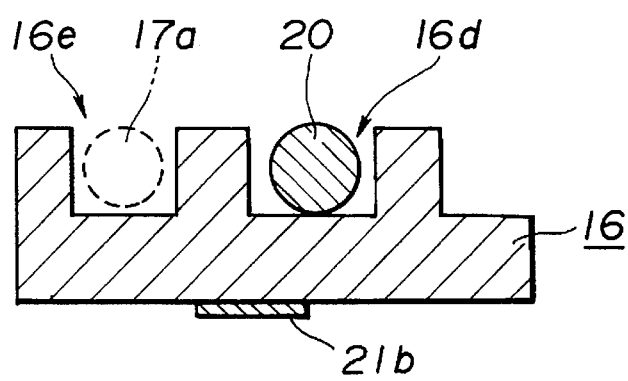
FIG. 6 is a central longitudinal sectional view of a lower member constituting the microphone arm taken along section lines 6—6 of FIG. 5.

As shown in FIG. 6, three ribs are formed along the entire length across the width on the inner surface of the lower member 16, whereby a core receiving groove 16d is engaged by a bar-shaped core member 20, and a lead wire fitting groove 16e is engaged by a lead wire 17a of the microphone 17 are formed.

The microphone 17 is inserted into a space between the microphone supporting pieces 16b of the above-described lower member 16 and assembled as by clamping both sides of the member as shown by a chain line in FIG. 5. The lead wire 17a is fitted in the lead wire fitting groove 16e and led as far as the axial hole 16a.

As shown in FIG. 4, the one end of the lower member 16 formed with the axial hole 16a is fitted with a bearing plate 18 in the form of a comma-shaped bead fitted to the shape of the end of the member 16. The bearing plate 18 functions to maintain the mechanical strength of the pivot unit of the microphone arm 3 and to link the tubular shaft 25 of the rotation supporting unit 22 via an E-ring or retaining ring.

To the bearing plate 18 is connected one end of the bar-shaped core 20 formed of a shape memory alloy exhibiting the properties of restoration to its linear shape following deformation. The core member 20 is fitted to the core member fitting groove 16d and has its other end extending proximate the microphone supporting pieces 16b formed at the other end of the lower member 16. Because the above-described microphone arm 3 has sufficient elasticity by the characteristics of the materials of the upper member 15 and the lower member 16, if it is deformed elastically on application of a larger force by mistake it is thereby prevented from being broken. Besides, a pre-set amount of rigidity is afforded by the enclosed bar-shaped core member 20 formed of the shape memory alloy having the characteristics of restoration to its linear form.

A hook switch unit 21 is arranged between the opposite lateral surfaces of the telephone main body 2 and the microphone arm 3 rotatably supported on the left lateral surface 2A of the telephone main body 2. The hook switch unit 21 is constituted by a magnetic switch made up of a Hall effect integrated circuit 21a provided in the mounting hole 2a in the left lateral surface 2A and a magnetic plate 21b bonded to the lateral surface of the lower member 16 of the transmitter member 3.

The magnetic plate 21b and the Hail effect integrated circuit 21a are usually mounted in a mutually facing relation in which state the portable telephone 1 is maintained in the call standby state. When the microphone arm 3 is rotated relative to the telephone main body 2, the holding state is released and the portable telephone 1 is in a call-enabled state.

Meanwhile, the hook switch unit 21 may also be an optical switch made up of an optical element and a reflector plate, or the hook switch unit 21 may also be a mechanical switch unit taking advantage of the mechanical operations of the microphone arm holding means 34 or the rotation supporting unit 22.

The microphone arm 3 is rotatably supported on the right lateral surface 2A of the telephone main body 2 via the rotation supporting unit 22. As shown in FIG. 4, the rotation supporting unit 22 is made up of a bearing block 23, a bearing member 24 formed integrally with the tubular shaft 25, a torsion spring 26, a coil spring 27 and detent means 28, and is mounted on the inner surface on the left lateral surface of the upper member 5 via a set screw 29 threaded into the tapped hole 14.

The bearing block 23, in a substantially rectangular shape, has an axial hole 23a traversed by the tubular shaft 25 of the bearing 24, and a circular bearing recess 23b concentric with the bearing hole 23a is formed in the lateral surface 23A. An L-shaped spring retainer 23c is protuberantly formed in the axial direction at an open edge of the lateral surface 23A constituting the bearing recess 23b.

The upper surface 23B of the bearing block 23 is formed with an opening 23d for a detent mechanism 28 in the heightwise direction in communication with the bearing recess 23b. The detent mechanism 28 is made up of a ball bearing 30, a spring 31 and a set screw 32 assembled in the opening 23d of the mechanism 28, as later explained.

The bearing member 24 is formed in a disc shape fitted to the bearing recess 23b of the bearing block 23, and a detent recess 24a having a U-shaped cross-section is formed on the outer lateral surface of the bearing member 24. The lateral surface 24A of the bearing member 24 which is flush with the lateral surface 23A of the bearing block 23 when the bearing member 24 is housed within the bearing recess 23b is formed with a retention hole 24b for retaining the end of the torsion spring 26.

When the bearing member 24 is housed within the bearing recess 23b, the tubular shaft 25 formed integrally with the lateral surface 24B facing the lateral surface 24B of the bearing member 24 traverses the axial bearing 16a formed in the lower member 16 of the transmitter member 3 so as to be introduced into an axial hole 16a formed in the lower member 16 of the transmitter member 3. The outer peripheral surface of the forward end of the tubular shaft 25 is formed with an E-ring fitting groove 25a.

The bearing plate 18, in other words, the transmitter member 3, is mounted and secured at the distal end of the tubular shaft 25 fitted into the axial hole 16a.

The lateral surface 24A of the bearing member 24 is formed integrally with a tubular shaft 33 having a center hole communicating with the center hole of the tubular shaft 25. The peripheral surface of the distal end of the tubular shaft 33 is formed with an E-ring or retaining ring fitting groove 33a. The torsion spring 26 is fitted to the outer periphery of the tubular shaft 33 by prevention of extrication by the E-ring 34 fitted in the E-ring fitting groove 33a.

Of course, the bearing member 24 is resiliently held in the axial direction under the resiliency of the torsion spring 26 and the coil spring 27, by fitting E-rings or retaining rings 19, 34 on both ends of the tubular shafts 25, 33 and by axially mounting the springs 26, 27 under compression on the tubular shafts 25, 33 by these E-rings 19, 34.

Meanwhile, the coil springs 27 afford an axial frictional force to the bearing member 24 rotated in the bearing recess 23b while preventing idle motion of the bearing member 24, in other words, the microphone arm 3.

The torsion spring 26 is retained by having its end 26a introduced into a retention hole 24b in the bearing member 24. Besides, the torsion spring 26 has its other end 26b extended in the peripheral direction introduced into the bearing recess 23b in the bearing block 23 and is engaged in this state with the spring retention piece 23c.

Since the bearing block 23 secured to the inner surface wall of the upper case 5 and the bearing member 24 rotatable with respect to the bearing block 23 are interconnected in this manner by the torsion spring 26, the microphone arm 3, interconnected via the bearing member 24, in other words, by the tubular shaft 25, is biased into rotation under the force of elasticity accumulated in the torsion spring 26.

The bearing member 24 is assembled together with the bearing block 23 as by being housed within the bearing recess 23b. In this state, the set screw 32 is threaded after the ball bearing 30 and the coil spring 31 are introduced into the detent mechanism assembling hole 23d. The ball bearing 30 is caused to bear against the peripheral surface of the bearing member 24 under the resiliency of the coil spring 31.

Meanwhile, the lead wire 17a of the microphone 17, engaged in the lead wire fitting groove 16d and led out as far as the axial hole 16a, is passed through the center holes in the tubular shafts 25, 33 so as to be introduced into the inside of the telephone main body 2 for connection to the control printed circuit board (not shown).

The microphone arm 3, biased into rotation by the torsion coil spring 26 and having its one end supported by the rotation supporting unit 22, has its free end held by the microphone arm holding unit 34. The microphone arm holding unit 34 is made up of an operator 35 formed as one with a holding pin 36 and an elastic member 37, as shown in FIG. 3, in which a pair of elastic member mounting pieces 38A, 38B are mounted upright on the inner wall surface of the upper lateral surface 2C of the lower case 6, so that the axes thereof are coincident with the operator guide groove 12. The elastic member 37, formed by bending a spring plate into substantially a W-shape, is supported in a cantilever fashion by having its one end inserted between two elastic member mounting pieces 38A and 38B.

The operator 35 assembled to the operator guide groove 12 is formed as one with a supporting wall 36a, the outer lateral edge of which is formed integrally with the holding pin 36. The operator 35 is biased toward the outside right surface 2A of the telephone main body 2 by the free end of the resilient member 37 being resiliently engaged with the inner lateral edge of the supporting wall 36a, in other words, the holding pin 36 is biased to protrude from the holding pin guide hole 11 under the force of the elastic member 37.

On the other hand, the operator 35 in its entirety is in an L-shape and has its first operating section 35A and its second operating section 35B constituted so as to be in register with the operator guide groove 12 formed across the right side surface 2A and the lower surface of the telephone main body 2.

The microphone arm 3 thus constructed is retained and held by the holding unit 34 assembled along the right lateral surface 2A of the telephone main body 2 by engaging the end of the holding pin 36 protruded from the holding pin guide groove 11 in the engaging hole 16c of the microphone arm 3.

Thus the operator 35 is thrust along the operator guide groove 12 against the resiliency of the resilient member 37 by one of the first operator section 35A and the second operator section 35B. By the operation of the operator 35, the holding pin 36, having its distal end engaged in the engaging hole 16c of the microphone arm 3, is retracted from the holding pin guide groove 11 so that the state of retention and holding of the microphone arm 3 is released. The microphone arm 3 is rotated with the tubular shaft 25 of the rotation supporting unit 22 as a fulcrum point, as shown by an arrow in FIG. 2, under the force of elasticity stored in the torsion spring 26. The rotation of the microphone arm 3 relative to the telephone main body 2 is automatically stopped at a position Θ above the horizontal plane, as shown in FIG. 2.

Figure 7:
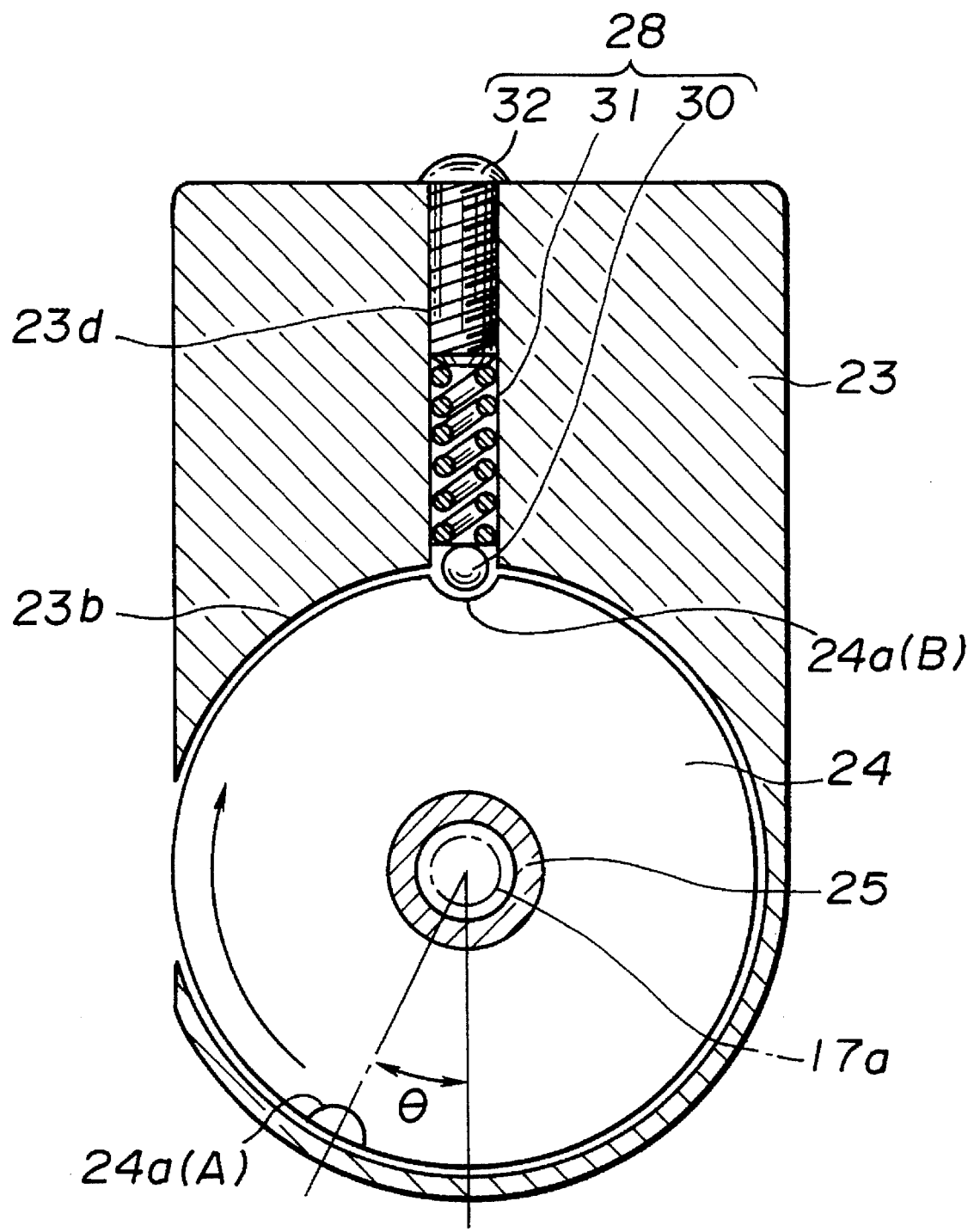
FIG. 7 is a longitudinal sectional view useful in explaining the operation of the microphone arm holding unit of the portable telephone of FIG. 1.

The automatic stop operation is explained by referring to FIG. 7. In the first state in which the microphone arm 3 is accommodated within the protective cover 10 along the right lateral surface 2A of the telephone main body 2 and retained and held by the microphone arm holding member 34, the detent groove 24a of the bearing member 24 is shifted Θ relative to the centerline 1 in register with the assembly opening 23d of the detent mechanism 28.

When the microphone arm holding unit 34 is actuated, the microphone arm 3 is rotated counterclockwise as shown by the arrow in FIG. 7 under the resiliency stored in the torsion spring 26. When the detent groove 24a of the bearing member 24 is rotated to a position 24a(B) in register with the detent mechanism 28, the ball bearing 30 of the detent mechanism 28 biased by the coil spring 31 is engaged in the detent groove 24a.

This causes the rotation of the bearing member 24, as well as rotation of the microphone arm 3, to be stopped. In this manner, the microphone arm 3 is automatically stopped at a position corresponding to the angle Θ above the horizontal plane relative to the telephone main body 2, by the detent groove 24a being rotated through a range from an initial position offset Θ in the rotating direction relative to the centerline passing through the detent mechanism 28.

As for the detent mechanism 28 for automatically stopping the microphone arm 3 at the pre-set angular position, the elastic member 24 may be formed with a detent protrusion in place of a detent groove 24a on the peripheral surface of the bearing member 24 and the ball bearing 30 and the coil spring 31 may be formed by an elastic plate having a retention section facing the rotational range of the protrusion.

Meanwhile, the rotation supporting mechanism 22 of the microphone arm 3 plays the role of preventing destruction if an excessive load is applied in the rotating direction on the microphone arm 3 when in use. That is, if an excess load in the rotating direction is applied to the microphone arm 3, the bearing member 24 raises and rotates the ball bearing 30 engaged in the detent groove 24a against the elasticity of the coil spring 31. The rotation of the microphone arm 24 is allowed by the rotation of the bearing member 24. Thus there is no such inconvenience that the microphone arm 3 or the rotation supporting unit 22 will be destroyed under the excessive load.

In the above-described embodiment, the microphone arm 3 having the detent groove 24a on the peripheral surface of the bearing member 24 is automatically stopped at a standard optimum position of the ear speaker 7 and the microphone 17, however, by providing plural detent grooves, the microphone arm 3 may also be stopped at any of a number of positions thought by the user to be most desirable.

Although the present invention has been described hereinabove with reference to the preferred embodiment, it is to be understood that the invention is not limited to such illustrative embodiment alone, and various modifications may be contrived without departing from the spirit or essential characteristics thereof, which are to be determined solely from the appended claims.

What is claimed is

1. A portable telephone comprising:

a telephone main body of rectangular shape with a first width and having a speaker, a dial switch unit, and a power battery, said Speaker and said dial switch unit being arranged on a flat front surface of said main body;

a slender elongate microphone arm having a microphone mounted at one end thereof and being of a second width substantially less than said first width of said main body;

a rotation supporting unit for rotatably attaching said slender, elongate microphone arm at an end opposite said one end to a right side of said telephone main body relative to said front thereof, said rotation supporting unit including resilient means for biasing said elongate microphone arm to rotate to a first predetermined position relative to said telephone main body;

excessive rotation means formed with said rotation supporting unit for permitting rotation of said slender elongate microphone arm to rotational positions beyond said first predetermined position when a further force exceeding said biasing force and in the same direction thereof is applied to said slender elongate microphone arm when in said first predetermined position; and microphone arm holding means mounted in said telephone main body for engagement with said one end of said slender elongate microphone arm and holding said slender elongate microphone arm in a second predetermined position relative to said telephone main body against a biasing force of said resilient means, said microphone arm holding means including operating means mounted on said right side of said main body for actuation by a finger of the left-hand of a user for releasing said slender elongate microphone arm from said second predetermined position for movement to said first predetermined position.

2. The portable telephone according to claim 1, wherein said microphone arm holding means includes a pin protruding from said right side of said telephone main body and said one end of said slender elongate microphone arm includes an aperture for receiving said pin.

3. The portable telephone according to claim 2, wherein said operating means includes an elastic element for biasing said pin to protrude from said telephone main body and a slide element attached to said pin for movement against a force of said elastic means and retracting said pin from a protruded position.

4. The portable telephone according to claim 1, further comprising rotational position regulating means for regulating rotation of said slender elongate microphone arm, so that upon said slender elongate microphone arm being released from said second predetermined position said slender elongate microphone arm rotates to said first predetermined position.

5. The portable telephone according to claim 4, wherein said rotational position regulating means is assembled with said rotation supporting unit.

6. The portable telephone according to claim 1, wherein said rectangular shape of said telephone main body has a length and said slender elongate microphone arm has a length substantially equal to the length of said telephone main body.

7. The portable telephone according to claim 6, further comprising a protective cradle having a substantially L-shaped cross section mounted to said right side of said telephone main body and extending parallel to the length of said telephone main body, said protective cradle receiving said slender elongate microphone arm in said second predetermined position.

8. The portable telephone according to claim 1, wherein said slender elongate microphone arm is formed of resilient plastics material and includes a core member arranged therein and formed of a shape memory alloy, so that said slender elongate microphone arm returns to an original shape following deformation.

9. The portable telephone according to claim 8, wherein said slender elongate microphone arm has a pair of grooves formed internally therein, a first of said grooves housing said core member and electrical leads of said microphone housed in a second of said grooves.

* * * * *

UNITED STATES PATENT AND TRADEMARK OFFICE
CERTIFICATE OF CORRECTION

PATENT NO. : 5,504,813
DATED : April 02, 1996
INVENTOR(S) : Yukio Takasaki

It is certified that error appears in the above-identified patent and that said Letters Patent is hereby corrected as shown below:

Col.6, line 4, change "Hail" to --Hall--

<u>In the claims</u>:
Co..9, line 16, change "Speaker" to --speaker--

Signed and Sealed this

Third Day of February, 1998

*Attest:*

BRUCE LEHMAN

*Attesting Officer*     Commissioner of Patents and Trademarks